United States Patent
Muramatsu et al.

(10) Patent No.: US 7,842,119 B2
(45) Date of Patent: Nov. 30, 2010

(54) SOLIDIFICATION PRODUCT OF DUST GENERATED DURING STEEL MAKING AND METHOD FOR PRODUCTION THEREOF

(75) Inventors: Katsutoshi Muramatsu, Kuwana (JP); Norio Misaki, Kurashiki (JP)

(73) Assignees: NTN Corporation, Osaka (JP); Daiwa Steel Corporation, Hyogo (JP)

( * ) Notice: Subject to any disclaimer, the term of this patent is extended or adjusted under 35 U.S.C. 154(b) by 384 days.

(21) Appl. No.: 11/884,557

(22) PCT Filed: Feb. 17, 2006

(86) PCT No.: PCT/JP2006/302810

§ 371 (c)(1), (2), (4) Date: Aug. 17, 2007

(87) PCT Pub. No.: WO2006/088121

PCT Pub. Date: Aug. 24, 2006

(65) Prior Publication Data

US 2008/0148903 A1  Jun. 26, 2008

(30) Foreign Application Priority Data

Feb. 18, 2005  (JP)  .............................. 2005-041641

(51) Int. Cl.
C22B 1/14  (2006.01)
(52) U.S. Cl. .............................. 75/317; 75/320; 75/504; 75/770

(58) Field of Classification Search ................... 75/317, 75/320, 504, 770, 771
See application file for complete search history.

(56) References Cited

U.S. PATENT DOCUMENTS

| | | | | |
|---|---|---|---|---|
| 3,377,146 A | * | 4/1968 | Von Stroh | 75/321 |
| 3,770,416 A | * | 11/1973 | Goksel | 75/504 |
| 4,123,257 A | * | 10/1978 | Fukuoka et al. | 75/500 |
| 4,213,779 A | * | 7/1980 | Caswell | 75/505 |
| 4,613,363 A | * | 9/1986 | Wienert | 75/10.62 |
| 5,873,925 A | * | 2/1999 | Rinker et al. | 75/436 |

(Continued)

FOREIGN PATENT DOCUMENTS

CN  1023935  10/1991

(Continued)

OTHER PUBLICATIONS

Patent Abstracts of Japan 2005-089842 dated Apr. 7, 2005 (2 pages).

(Continued)

*Primary Examiner*—George Wyszomierski
*Assistant Examiner*—Ngoclan T Mai
(74) *Attorney, Agent, or Firm*—Osha Liang LLP (57) ABSTRACT

A solidified product (B) is produced by charging a dust (11) generated in a steel making process and containing iron and an oxide thereof as a principal component into a mold (7) and by subjecting it to a pressure molding. A raw material charged to the mold is a mixed granulated product (11p) prepared by mixing the dust and a powder containing carbon as a principal component and by granulating the resultant mixture.

11 Claims, 5 Drawing Sheets

U.S. PATENT DOCUMENTS

| | | | |
|---|---|---|---|
| 6,235,085 B1 * | 5/2001 | Masso et al. | 75/770 |
| 6,676,725 B2 * | 1/2004 | Aota et al. | 75/246 |
| 6,993,855 B2 * | 2/2006 | Ibaraki et al. | 34/312 |
| 2007/0163388 A1 * | 7/2007 | Sada | 75/770 |

FOREIGN PATENT DOCUMENTS

| | | |
|---|---|---|
| CN | 1223304 | 7/1999 |
| EP | 1-170 384 A1 | 1/2002 |
| JP | 36-008408 | 3/1960 |
| JP | 62284007 A | 12/1987 |
| JP | 9-316512 | 12/1997 |
| JP | 11012624 A | 1/1999 |
| JP | 11-152511 | 6/1999 |
| JP | 2002-167624 | 6/2002 |
| JP | 2002-194449 | 7/2002 |
| JP | 2003027118 A | 1/2003 |
| JP | 2003-82418 | 3/2003 |
| JP | 2003-105452 | 4/2003 |
| JP | 2004-010985 | 1/2004 |
| JP | 2005-89842 | 4/2005 |
| JP | 2006-225679 A | 8/2006 |

OTHER PUBLICATIONS

Patent Abstracts of Japan 2003-105452 dated Apr. 9, 2003 (2 pages).
Patent Abstracts of Japan 2002-167624 dated Jun. 11, 2002 (2 pages).
Patent Abstracts of Japan 2003-082418 dated Mar. 19, 2003 (2 pages).
Patent Abstracts of Japan 2004-010985 dated Jan. 15, 2004 (2 pages).
Patent Abstracts of Japan 11-152511 dated Jun. 8, 1999 (2 pages).
Patent Abstracts of Japan 09-316512 dated Dec. 9, 1997 (1 page).
Patent Abstracts of Japan 2002-194449 dated Jul. 10, 2002 (2 pages).
Notification of Transmittal of Copies of Translation of the International Preliminary Report on Patentability (Chapter I or Chapter II of the Patent Cooperation Treaty) for International Application No. PCT/JP2006/302810, mailed on Aug. 30, 2007 (6 pages).
Chinese Office Action for Chinese Application No. 2006800045345, mailed on Feb. 20, 2009 with comment (7 pages).
esp@cenet patent abstract for Chinese Publication No. 1223304, Publication date Jul. 21, 1999 (1 page).
Chinese Patent Abstract for Chinese Publication No. 1055131, Publication date Oct. 9, 1991 (1 page) (Corresponds to Chinese Publication No. 1023935).
Office Action in Chinese Patent Application No. 200680004534.5, dated Apr. 21, 2010 and English translation thereof (11 pages).
Office Action in Japanese Patent Application No. 2005-041641, dated Jun. 1, 2010 (2 pages).
Patent Abstracts of Japan, Publication No. 11-012624, Publication date Jan. 19, 1999 (1 page).
Patent Abstracts of Japan, Publication No. 62-284007, Publication date Dec. 9, 1987 (1 page).
Patent Abstracts of Japan, Publication No. 2006-225679, Publication date Aug. 31, 2006 (1 page).
Patent Abstracts of Japan, Publication No. 2003-027118, Publication date Jan. 29, 2003 (1 page).

* cited by examiner

Water Content and Apparent Density of Granulated
Particles Containing Steelwork Dust and Carbon
※1 Apparent Density Measured In Completely
Dried Condition

SOLIDIFICATION PRODUCT OF DUST GENERATED DURING STEEL MAKING AND METHOD FOR PRODUCTION THEREOF

FIELD OF THE INVENTION

The present invention relates to a solidified product of steelmaking dust that is produced during the steelmaking in a smelting furnace or the like, so that the solidified product can be used as a material for steelmaking, and also to a method of making such solidified product.

BACKGROUND ART

Finely divided particles of iron and ferric oxide blown up during the iron and steel making process, for example, in a smelting furnace or the like are generally collected by a dust collector as dust. This kind of dust (hereinafter referred to as "steelmaking dust") contains iron and ferric oxide as a principal component and, therefore, the reuse thereof is desirable. However, since the steelmaking dust is made up of finely divided particles, the finely divided particles may scatter and blow upwards in the smelting furnace, when such finely divided particles are charged directly into the smelting furnace, and most of the finely divided particles may be subsequently collected again in the dust collector, resulting in reduction in efficiency with which the steelmaking dust can be reused. For this reason, it has hitherto been quite often to dispose most of steelmaking dust in reclaimed lands, but considering that the steelmaking dust generated in Japan amounts to hundred thousands of tons per year, disposal by filling up in land is not desirable in terms of not only the availability of reclamation sites and the effective utilization of resources, but the destruction of the environment.

In view of the foregoing, various attempts have hitherto been made to reuse the steelmaking dust. For example, the Japanese Laid-open Patent Publication No. 11-152511 discloses formation of the steelmaking dust into pellets of about 2 to 15 mm in diameter and charging the resultant pellets into an electric furnace to recover ferric oxides during the course of the hot metal process.

The Japanese Laid-open Patent Publication No. 9-316512 discloses briquetting of the steelmaking dust, in which thermoplastics is added and the Japanese Laid-open Patent Publication No. 2002-194449 discloses briquetting of the steelmaking dust and grinding sludge, in which a solidification accelerating agent is added.

Although in the pellet forming method disclosed in the first mentioned patent document, the handling is easy in charging the recovered dust into the electric furnace in view of the dust having been palletized, the efficiency of charging into the electric furnace is problematic since the pellets so formed have a relatively small size.

The method disclosed in each of the second and third mentioned patent documents, in which the additive is used, is an effective means of forming solid briquettes, but a problem has been found in that the addition of the additive such as plastics or binders tends to render the process to be complicated and costly. Also, it is not desirable since the additive used tends to constitute a cause of environmental load.

DISCLOSURE OF THE INVENTION

An object of the present invention is to provide solidified product of the steelmaking dust containing iron and its oxide produced during the steelmaking in a smelting furnace or the like and molded under pressure, which product has a practically sufficient strength with little additive being added to the steelmaking dust as far as possible and which product is effective to improve the thermal efficiency of the furnace during the re-charging into the furnace.

Another object of the present invention is to provide a method of making solidified product of the steelmaking dust, which is effective to provide at a reduced cost, the solidified product of the steelmaking dust that utilized the various advantages discussed above.

The steelmaking dust solidified product of the present invention is a steelmaking dust solidified product including a dust containing, as a principal component, iron and its oxides, produced during a steelmaking, and molded under pressure within a mold with a raw material supplied thereinto. The raw material to be charged into the mold is prepared from granulated particles of the dust and a powdery material, including carbon as a principal component, which are mixed together and granulated.

The method of making the steelmaking dust solidified product, which is herein provided in accordance with the present invention, is a method of making the steelmaking dust solidified product of the present invention referred to above. This method is a method, by which the steelmaking dust solidified product is manufactured in the form of a product made by press-molding within a mold while the dust containing, as a principal component, iron and its oxides produced during the steelmaking is charged into the mold. As a raw material to be charged into the mold, granulated particles of the dust and a powdery material including carbon as a principal component, which has been granulated, is employed.

During the molding to provide the steelmaking dust solidified product, even if the molding pressure is increased, it does not necessarily result in increase of the strength because of the internal friction or the like. Although the use of the binder is effective to increase the strength of the steelmaking dust solidified product, addition of the binder such as, for example, plastics is undesirable in terms of the cost and the cause of the environmental load as hereinbefore discussed.

Also, the addition of the carbon material such as, for example, the powder of the granulated carbon to the solidified product of the steelmaking dust that can be employed for the recycle of an electric furnace or the like is extremely important to increase the thermal efficiency of the electric furnace. This is because the powder of the granulated carbon so added generates heat as a result of self-combustion thereof while reducing the steelmaking dust, thus minimizing the supply of energies from the external enough to increase the thermal efficiency of the furnace. Accordingly, the steelmaking dust solidified product added with the carbon powder may become an effective means for the recycle of the steelmaking dust. Because the powder containing carbon as a principal component can easily be available similarly during the iron and steel making process as is the case with the steelmaking dust or in and around the iron and steel making, any increase of the cost can be suppressed even though the addition of the carbon powder is made. However, the addition of the carbon material may involve the possibility of impairing the strength of the solidified product.

In view of the foregoing, the inventors of the present invention have conducted a series of studies and experiments and, as a result thereof, have found that a higher molding density can be obtained if the steelmaking dust to be molded under pressure within the mold is charged into the mold in a granulated form than if the same is charged into the mold in a powder form. Thus, when the granulated form of the steelmaking dust is molded under pressure, the practically sufficient strength of the steelmaking dust solidified product can be obtained with no necessity of using a reinforcement agent, particularly a binder or the like.

In particular, since the present invention employs, as a raw material, the granulated particles of the dust with a powdery material including carbon as a principal component, an advantage, brought about by the addition of the powdery material containing carbon as a principal component, and an advantage, brought about by the molding under pressure while it is charged into the mold in a granulated form, can be obtained. Because of this, securement of a practically sufficient strength accompanied by reduction of the cost as far as possible with no additive used can be effectively accomplished and, also, the thermal efficiency at the time of re-charging into the furnace can be improved.

In the steelmaking dust solidified product and the method of making the same, both provided in accordance with the present invention, the granulated particles referred to above may have a water content within the range of 0.5 to 15 wt %.

If the water content of the granulated particles is lower than 0.5 wt %, the molding is almost impossible because of cracking, for example, occurring in the steelmaking dust solidified product that is eventually formed. On the other hand if the water content of the granulated particles is higher than 15 wt %, the granulated particles will soften to a muddy state to such an extent that granulation is no longer possible. Also, a water component is considered having such an effect that when the granulated particles undergo a plastic deformation within the mold, friction of the granulated particles can be reduced to facilitate the deformation. Such effect manifests when the water content is 0.5 wt %, but when the water content is in a region exceeding the uppermost limit of 15 wt %, the water component itself behaves as a liquid and, therefore, it may result in a reverse effect against an increase of the apparent density of the steelwork dust solidified product. The water content, at which the strength of the practically utilizable steelmaking dust solidified product can be obtained, is within the range of 0.5 to 15 wt %.

Also, in the steelmaking dust solidified product and the method of making the same, both provided in accordance with the present invention, the powdery material including carbon as a principal component may not be always limited to a pure carbon powder, but may be a powder of graphite.

In the steelmaking dust solidified product and the method of making the same, both provided in accordance with the present invention, the amount of carbon contained in the raw material referred to above may be within the range of 2 to 50 wt %.

As hereinabove described, addition of the carbon material such as, for example, the carbon powder to the solidified product of the steelmaking dust that is used for recycle of the electric furnace or the like is extremely important to increase the thermal efficiency of the electric furnace. However, the addition of the carbon material may involve the possibility of reducing the strength of the solidified product.

In view of the above, the inventors of the present invention, after having conducted a series of studies and experiments, have found that where the granulated particles, which are prepared by adding the carbon material such as the powdery material of carbon or the like to a granulating machine, used to granulate the steelmaking dust together with the steelmaking dust, is employed as a raw material, an excellent moldability can be obtained even with the addition of carbon if the amount of carbon to be added is selected to a value smaller than 50 wt % relative to the granulated particles of the powdery material containing the steelmaking dust and the carbon as principal components. The reason for the selection of the lowermost limit to 2 wt % is because if the amount of carbon to be added is smaller than this lowermost limit, no effect to improve in thermal efficiency of the furnace at the time of re-charging into the furnace can be obtained. Thus, if the raw material to be supplied into the mold is selected to be the granulated particles which are prepared by mixing the steelmaking dust with the carbon material such as the powdery material of carbon or the like and then granulating the resultant mixture and the amount of carbon contained in the raw material is selected to be within the range of 2 to 50 wt %, the practically sufficient strength of the steelmaking dust solidified product can be obtained even though the carbon has been added, but no reinforcement agent such as a binder or the like is employed. Also, an effect of increasing the thermal efficiency of the furnace at the time of re-charging into the furnace can be obtained.

Where the amount of carbon added to the raw material is chosen to be within the range of 2 to 50 wt % as discussed above, the apparent density of the solidified product may be within the range of 2.15 to 3.6 $g/cm^3$ in a completely dried condition.

Considering the amount of the powdery additive, which contains carbon as a principal component, and the molding pressure capable of achieving solidification, the strength enough to facilitate handling can be maintained when the apparent density of the steelmaking dust solidified product is within the range of 2.15 to 3.6 $g/cm^3$ in a completely dry condition.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1:
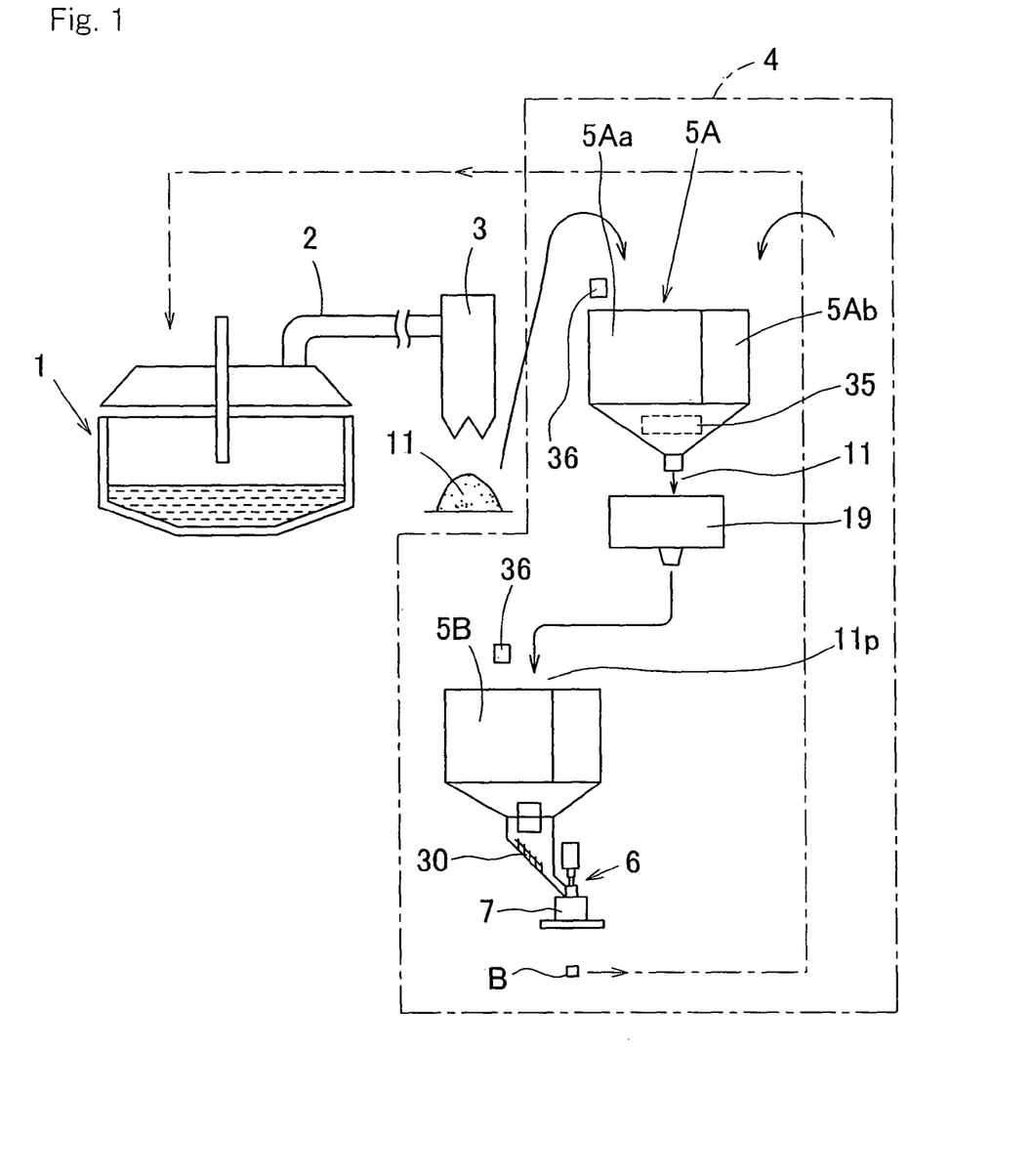
FIG. 1 is an explanatory diagram showing a process of making a steelmaking dust solidified product and an apparatus for making the same in accordance with a preferred embodiment of the present invention.

A preferred embodiment of the present invention will be described in detail with particular reference to FIGS. 1 to 3. Referring to FIG. 1, a steelmaking dust produced in a smelting furnace 1 is introduced into a dust collector 3 together with exhaust gases through an exhaust duct 2, and the steelmaking dust 11 contained in the exhaust gases are collected by the dust collector 3 and are subsequently discharged in the form of a powdery material. This steelmaking dust 11 contains iron and its oxides as a principal component. The steelmaking dust 11 discharged from the dust collector 3 is supplied by means of a transport device (not shown) to a first hopper 5A included in a steelmaking dust solidified product making apparatus 4.

The first hopper 5A includes a steelmaking dust container 5Aa and a carbon powder container 5Ab, and the steelmaking dust 11 is cast into the steelmaking dust container 5Aa. The carbon powder container 5Ab is supplied with a powdery material (not shown), containing carbon as a principal component, through a channel separate from that for the steelmaking dust 11. The powdery material containing the carbon as a principal component is not always limited to a pure carbon powder, but may be graphite.

The first hopper 5A also includes a mixing device 35 for mixing the steelmaking dust 11, contained within the steelmaking dust container 5Aa, and the powdery material, containing carbon as a principal component and contained within the carbon powder container 5Ab, in a predetermined mixing ratio. This mixing device 35 may be made up of, for example, a mixing and agitating chamber and a screw conveyor or an agitating blade assembly.

A powdery mixture of the steelmaking dust 11 and the powder containing carbon as a principal component discharged from the first hopper 5A is subsequently supplied to a granulating machine 19, which is operable to granulate the powdery mixture to form granulated particles 11p. The granulated particles 11p are a granulated mixture of the steelmaking dust 11 and the powder containing carbon as a principal component. The granulating machine 19 may include, for example, a rotary drum (not shown), within which a suitable water component is added to the powder to coagulate the latter so that the particles can represent a globular shape. The granulated particles 11p may have a particle size within the range of 5 to 15 mm and a water content within the range of 0.5 to 15 wt %. The granulated particles 11p of the steelmaking dust 11, granulated by the granulating machine 19, are then supplied into a second hopper 5B.

It is to be noted that the first hopper 5A discussed above may be dispensed with and, instead, the steelmaking dust 11 may be granulated during the transport thereof by means of the transport device.

The second hopper 5B includes a dispensing device (not shown) that is operable to dispense the granulated particles 11p of the steelmaking dust 11 into a plurality of juxtaposed solidifying mechanisms 6 of the steelmaking dust solidified product making apparatus 4. Each of the solidifying mechanisms 6 is a mechanism for solidifying the granulated particles 11p of the steelmaking dust 11 into a steelmaking dust solidified product B of a briquette form (which product B is hereinafter referred to as "briquette") and includes a mold 7.

The second hopper 5B or each of the solidifying mechanisms 6 is provided with a forced filling device 30 for forcibly filling the granulated particles 11p, supplied from the second hopper 5B, into the corresponding mold 7.

Figure 2:
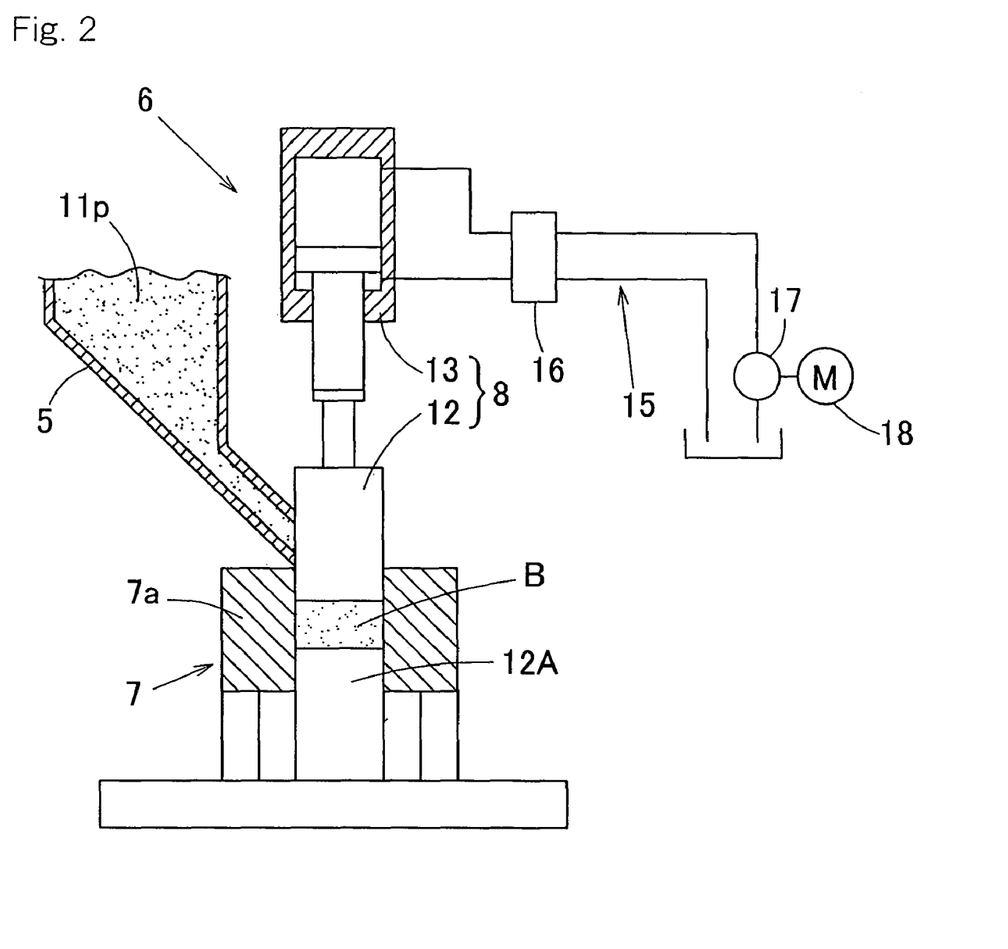
FIG. 2 is an enlarged longitudinal sectional view showing a portion of the solidified product making apparatus.

Each solidifying mechanism 6 includes, as shown in FIG. 2 on an enlarged scale, the mold 7 for molding under pressure the steelmaking dust 11 supplied from the hopper 5, a pressing device 8 for applying a pressure to the corresponding mold 7 for molding under pressure, and a pressure control unit (not shown) for controlling the pressing device 8 to attain a predetermined pressure.

The mold 7 is in the form of a vertically extending cylinder chamber having a sectional shape so designed as to allow the granulated particles 11p of the steelmaking dust 11 to be molded into a round-sectioned column (that is, a cylindrical body). The sectional shape of the mold 7 may be polygonal, in which case the briquette of a correspondingly polygonal shape can be manufactured. The mold 7 includes, specifically, a cylindrical die 7a and a plunger-like plug 12A inserted into a lower opening of the die 7a. The plug 12A is adapted to be driven by a plug open/closure mechanism (not shown) having a drive source so as to selectively open or close the lower opening of the die 7a. The plug 12A may be of a design, in which it does not enter into the mold 7, but seals the lower opening of the die 7a at one end thereof.

The pressing device 8 includes an elevatable plunger 12 capable of entering from above into the mold 7 to press the granulated particles 11p of the steelmaking dust then charged within the mold 7, and a pressing unit 13 for driving the plunger 12 to selectively move upwardly or downwardly. The pressing unit 13 may include, for example, a hydraulic cylinder, the drive of which is controlled by the above mentioned pressure control unit (not shown). The pressure control unit is operable to control a switching valve 16 in a hydraulic circuit or pipe line 15 for supplying an oil under pressure to the pressing unit 13 and/or a motor 18 of a pump 17. Other than the hydraulic cylinder referred to above, the pressing unit 13 may include a motor and a rotary-linear motion translating mechanism (not shown) such as, for example, a ball screw or the like operable to translate the rotary motion of the motor into a linear motion. Also, the pressing unit 13 may be disposed on respective sides of the plunger 12 and the plug 12A to perform the pressure control.

A rust resisting material is preferably used for at least respective surfaces of the mold 7 and the plunger 12, which contact the granulated particulates 11p during the molding. This rust resisting material is one or mixture preferably selected from the group consisting of cemented carbide, cermet, ceramics and stainless steel.

Figure 6:
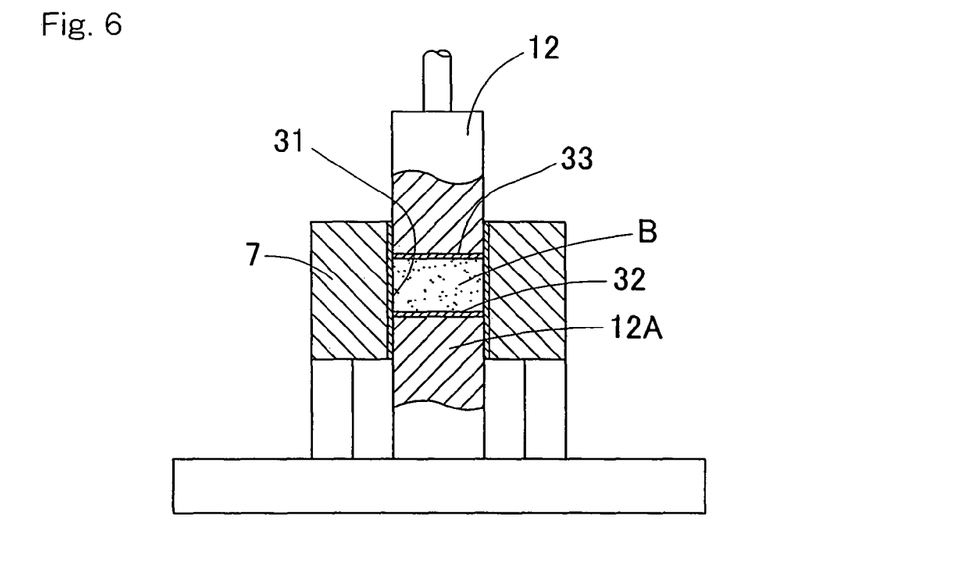
FIG. 6 is a longitudinal sectional view of a modified form of the mold for the solidified product making apparatus.

Instead of the mold 7 and the plunger 12 themselves being made of the rust resisting material, at least surfaces of the mold 7 and the plunger 12, which contact the granulated particles 11p, may be coated with rust resisting films 31, 32 and 33 as shown in FIG. 6. For the rust resisting films 31 to 33, one or more of chrome-plating, nickel-plating, chrome nitride, chrome carbide, titanium nitride, titanium carbide and diamond-like carbon can be suitably used.

A method of making a briquette (a steelmaking dust solidified product) B with the use of the steelmaking dust solidified product making machine 4 shown in FIG. 1 and a method of use of the briquette B so manufactured will now be described. The steelmaking dust 11, produced in the smelting furnace 1 and discharged from the dust collector 3 in a powder form, is supplied into the first hopper 5A. This steelmaking dust 11 contains iron and its oxides as a principal component. The steelmaking dust 11 so supplied into the hopper 5A is formed into granulated particles 11p by the granulating machine 19, which are in turn supplied into the mold 7 of each of the solidifying mechanisms 6 through the second hopper 5B.

In each solidifying mechanism 6, a predetermined amount of the granulated particles 11p of the steelmaking dust 11 is supplied from the hopper 5B, shown in FIG. 2, into the corresponding mold 7 and, thereafter, the plunger 12 driven by the pressing unit 13 enters the mold 7. In this condition, a predetermined pressure is applied to the granulated particles 11p within the mold 7. In such case, the molding pressure P (MPa) relative to the pressure acting sectional area (that is, the sectional area of the plunger 12)×(mm²) is so chosen as to fall within a predetermined range.

Figure 3:
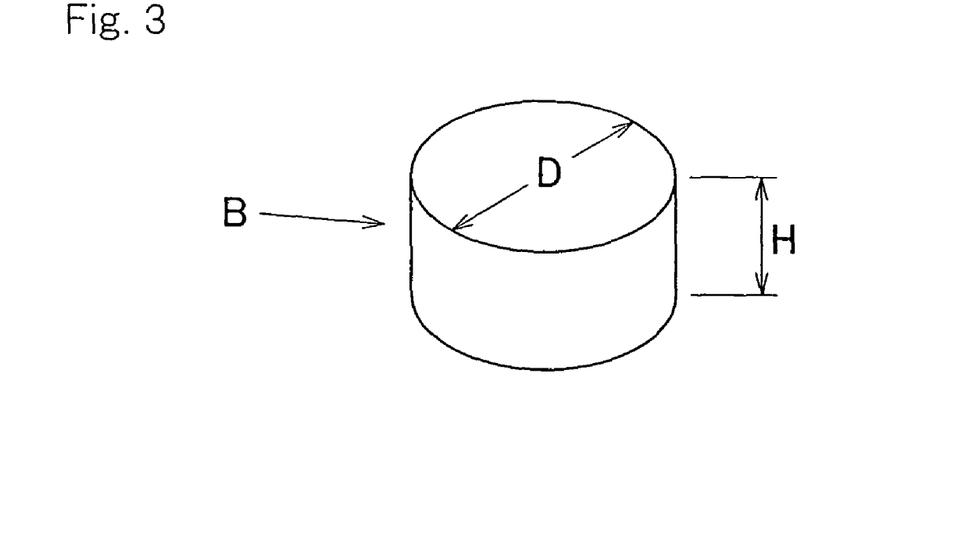
FIG. 3 is a perspective view showing an example of the steelmaking dust solidified product manufactured by the process of the present invention.

The briquette B manufactured in this manner has an appearance representing a cylindrical body in the case of the cylindrical mold as shown in FIG. 3. Also, the briquette B preferably has a diameter D within the range of 30 to 200 mm and also has a ratio (H/D) of the height H relative to the diameter D that is preferably within the range of 30 to 150%.

Referring again to FIG. 1, the briquettes B solidified by the solidifying mechanisms 6 are collected in a recovery container (not shown) and are, when the raw material is charged into the smelting furnace 1, supplied into the smelting furnace 1 together with other materials, with the briquettes B consequently reused as a steel making material. The raw material to be supplied into the smelting furnace 1 may be of a composition including a principal raw material, which may be, for example, hot metal obtained from a blast furnace, and an auxiliary raw material such as, for example, iron scraps and/or calcined lime.

In the practice of the above described method of making the briquettes B according to this embodiment, since as the raw material to be supplied into the mold, the granulated particles 11p prepared by mixing the steelmaking dust 11 and the powder including carbon as a principal component is employed, it is possible to make the briquettes B having a practically sufficient strength and capable of improving the thermal efficiency of the furnace at the time of re-charging into the furnace, with little additive added to the raw dust 11 so supplied. Also, those briquettes B can be manufactured at a reduced cost. The reason therefor will now be discussed.

Figure 4:
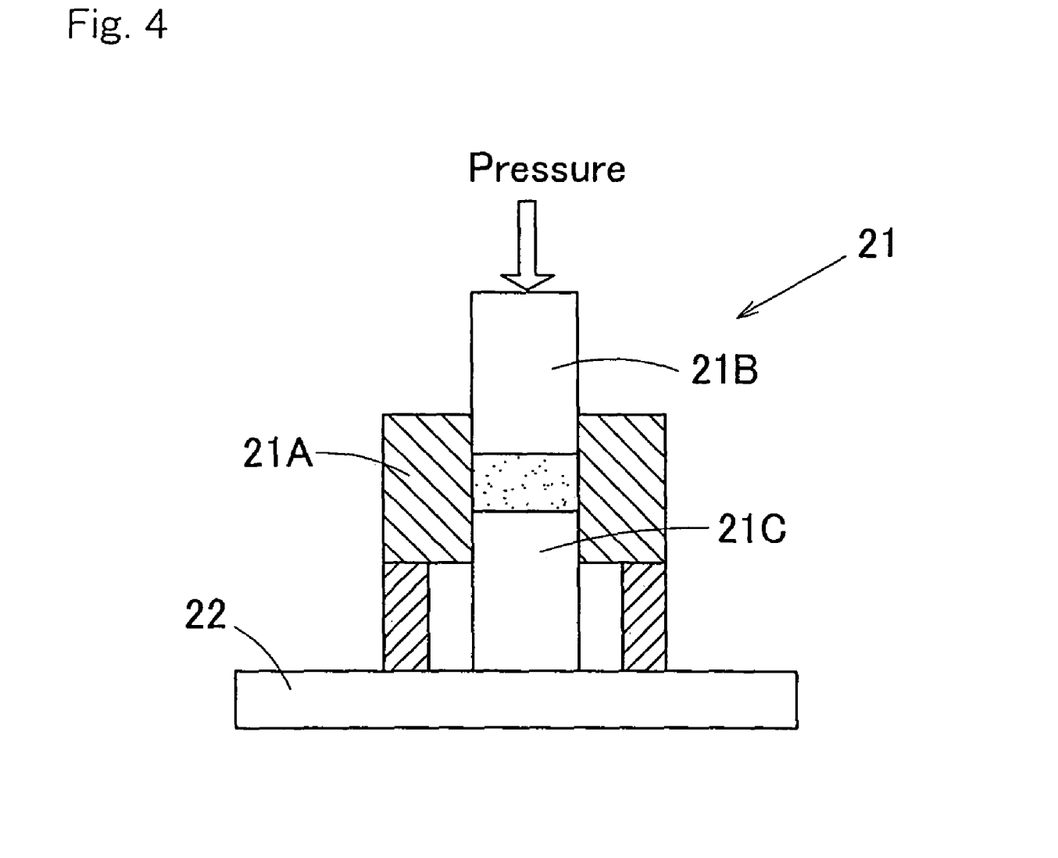
FIG. 4 is a longitudinal sectional view of a mold utilized during a solidifying test that has provided a basis of the solidified product making apparatus.

In order to examine the moldability of the steelmaking dust, the inventors of the present invention have conducted the following experiment to solidify the steelmaking dust with the use of a mold 21, which has a die including, as shown in FIG. 4, a cylindrical die 21A and a lower plunger 21C serving as a plug, and a pressing plunger 21B. It is to be noted that the die 21A, the lower plunger 21C and the pressing plunger 21B, all shown in FIG. 4, are respective equivalent to the die 7a, the plug 12A and the plunger 12 all employed in the solidifying mechanism 6 (FIG. 2).

Addition of a carbon material such as, for example, a carbon powder to the briquette B of the steelmaking dust that is recycled in the furnace or the like is extremely important in terms of improvement of the thermal efficiency of the electric furnace. This is because the carbon powder so added generates heat as a result of self-combustion thereof while reducing the steelmaking dust, thus minimizing the supply of energies from the external enough to increase the thermal efficiency of the furnace. Accordingly, the briquette B added with the carbon powder may become an effective means for the recycle of the steelmaking dust.

In the solidification of the briquette B, where no additive such as, for example, a binder effective to increase the strength of the molded body is employed, solidification of the briquette can be manifested by rearrangement and adherence by contact of powdery particles that are induced during molding under pressure. Since basically the adherence of the powder increases with increase of the contact surface area among the powder particles, the strength of the briquette may increase if the contact surface area among the powder particles is increased with increase of the molding pressure. However, considering that the powder particles cannot move freely in a way similar to liquid and that a frictional force develops among the powder particles and between the powder and the mold surfaces, the molding pressure has no direct connection with increase of the strength partly because the tight packing effect resulting from rearrangement of the powder particles during the compressive molding is so insufficient as to involve a large air gap volume and partly because the molding pressure becomes uneven due to a frictional loss, thereby forming a large difference in density within the molded body. Also, the difference in density and the residue air in air gaps within the molded body may constitute a major cause of generation of a so-called lamination, in which stratified cracks occur in a direction perpendicular to the direction of application of the molding pressure during separation of the mold at which the molding pressure is released, within a region of lower molding pressure.

While the foregoing is a problem generally observable during the molding of the powder, a more undesirable problem would possibly arise where the material such as the carbon powder or the like including carbon as a principal component is mixed. The carbon particles have a surface of a low activity and are therefore low in adherence. The finely divided carbon powder has a low bulk density and, as a result thereof may have a large air gap volume at the time the steelmaking dust material, mixed with the carbon powder, is filled in the mold. Generally, during the molding work, the air gaps can be reduced in volume and the residue air can also be expelled to a certain extent. However, the steelmaking dust material mixed with the carbon powder has such a characteristic that not only is the air gap volume large at the time of filling into the mold, but the residue air contained in the air gaps thereof tends to be blocked and is no longer expelled to the outside at an early stage subsequent to start of the molding and, accordingly, the briquette B compressed together with the residue air is accompanied by a spring back particularly in a direction conforming to the direction of molding and, therefore, lamination occurs from a region of low pressure molding.

Although in order to reduce the air gaps and the difference in molding density inside the molded body, it may be effective to improve the fluidity and the mold filing characteristic of the powdery particles by the addition of the binder and also to reinforce the briquette strength by the utilization of the adhesive strength of the binder, the present invention is aimed at providing a handy and inexpensive method, in which no binder is employed absolutely, and, accordingly, it is necessary to secure the practically sufficient briquette strength while nothing is made to the powdery raw material to be supplied.

In view of the above, as a result of a series of studies and experiments conducted on the steelmaking dust added with the carbon powder, it has been found that if the carbon material such as, for example, the carbon powder or the like is added to the granulating machine for granulating the steelmaking dust, the powdery mixture of the steelmaking dust with the granulated particles is prepared and molding is carried out with the use of such powdery mixture to form briquettes, adverse effects on the moldability, which may be brought about when the carbon powder is added, can be removed. In general, most steel manufacturers manufacture dust pellets, such as disclosed in the previously first mentioned patent document, with the use of the steelmaking dust and granulation is generally carried out by the use of the granulating machine.

The present invention has made it clear that when the carbon material such as, for example, the carbon powder or the like that is generally employed in the granulating process is added, granulated and used as a raw material for making briquettes, a practically sufficient briquette strength can be obtained even with no reinforcement agent such as, for example, any binder being especially used.

As an example, a solidifying experiment was carried out with the use of a mold designed to make a cylindrical briquette B, which includes, as shown in FIG. 4, a cylindrical die and a punch.

Material for the mold used for the test was employed in the form of SKH51 and SKD11, which had been plated with a hard chromium. The steelmaking dust employed was that discharged from an electric furnace and four samples thereof were prepared. Those four samples included (1) a sample, in which a mixture of the steelmaking dust and the carbon powder (4:1 in ratio by weight) were mixed and granulated in a granulating machine (5 to 15 mm in particle size), (2) a sample, in which only the steelmaking dust was granulated (5 to 15 mm in particle size) and the resultant granulated particles of such steelmaking dust were mixed with the carbon powder in a weight ratio of 4:1, (3) a sample, in which the steelmaking dust and the carbon powder in the form of a powder were mixed in a weight ratio of 4:1, and (4) a powdery sample made of only the steelmaking dust.

Using those four samples, cylindrical briquettes B, 70 in diameter and 80% in ratio of the height relative to the diameter, were made with varying molding pressures and were subsequently dried completely. Those briquettes B were tested to determine their apparent densities and drop strengths. The following Table 1 illustrates the apparent densities so determined and the drop strengths tested. With respect to the sample prepared from the granulated particles containing the steelmaking dust and the carbon powder, the briquette retained its shape with the application of the molding pressure within the range of 5 to 150 MPa and the range of molding pressure resulting in a drop strength of not lower than 50 cm was within the range of 50 to 150 MPa.

TABLE 1

Condition of Raw Material, Briquette Apparent Density and Briquette Drop Strength Test

| Molding Pressure (MPa) | Raw Material Powder | Apparent Density (g/cm³) | Drop Tests 10 cm | 30 cm | 50 cm | 70 cm | 90 cm |
|---|---|---|---|---|---|---|---|
| 5 | (1) | 1.98 | X | | | | |
| | (2) | Lamination | — | — | — | — | — |
| | (3) | Lamination | — | — | — | — | — |
| | (4) | 2.25 | X | | | | |
| 10 | (1) | 2.06 | ○ | X | | | |
| | (2) | Lamination | — | — | — | — | — |
| | (3) | Lamination | — | — | — | — | — |
| | (4) | 2.34 | ○ | X | | | |
| 25 | (1) | 2.2 | ○ | ○ | X | | |
| | (2) | Lamination | — | — | — | — | — |
| | (3) | Lamination | — | — | — | — | — |
| | (4) | 2.51 | ○ | ○ | X | | |
| 50 | (1) | 2.38 | ○ | ○ | ○ | X | |
| | (2) | Lamination | — | — | — | — | — |
| | (3) | Lamination | — | — | — | — | — |
| | (4) | 2.71 | ○ | ○ | ○ | X | |
| 75 | (1) | 2.49 | ○ | ○ | ○ | X | |
| | (2) | Lamination | — | — | — | — | — |
| | (3) | Lamination | — | — | — | — | — |
| | (4) | 2.83 | | | | | |
| 100 | (1) | 2.59 | ○ | ○ | ○ | X | |
| | (2) | Lamination | — | — | — | — | — |
| | (3) | Lamination | — | — | — | — | — |
| | (4) | 2.95 | ○ | ○ | ○ | X | |
| 150 | (1) | 2.67 | ○ | ○ | ○ | ○ | X |
| | (2) | Lamination | — | — | — | — | — |
| | (3) | Lamination | — | — | — | — | — |
| | (4) | 3.04 | ○ | ○ | ○ | ○ | X |
| 200 | (1) | Lamination | — | — | — | — | — |
| | (2) | Lamination | — | — | — | — | — |
| | (3) | Lamination | — | — | — | — | — |
| | (4) | Lamination | — | — | — | — | — |

*1 It is to be noted that in Table 1 below, (a) to (d) indicate the respective samples. In particular,
(1) represents Sample, in which a mixture of the steelmaking dust and the carbon powder (4:1 in ratio by weight) were mixed and granulated in a granulating machine (5 to 15 mm in particle size),
(2) represents Sample, in which only the steelmaking dust was granulated and the resultant granulated particles of such steelmaking dust were mixed with the carbon powder in a weight ratio of 4:1,
(3) represents Sample, in which the steelmaking dust and the carbon powder in the form of a powder were mixed in a weight ratio f 4:1, and
(4) represents Powdery sample made of only the steelmaking dust.
*2 The apparent density of each sample briquette was measured in a completely dried condition.
*3 In Drop Tests, ○ indicates that the briquette retained its shape and X indicates that the briquette was broken. The sample (2), in which only the steelmaking dust was granulated and the resultant granulated particles of such steelmaking dust were mixed with the carbon powder in a weight ratio of 4:1, and the sample (3), in which the steelmaking dust and the carbon powder in the form of a powder were mixed in a weight ratio of 4:1, showed that lamination took place over the entire range of the molding pressures tested and no shape could not be retained. The sample (4), made of only the steelmaking dust, and the sample (1), in which a mixture of the steelmaking dust and the carbon powder were mixed and granulated in a granulating machine, showed a substantially equal briquette strength.

While granulation is carried out by adding a proper amount of water to the powder within a rotating drum to coagulate so that globular particles can be formed, the apparent density of the granulated particles so manufactured by this method tends to become higher than the molding density of the molded body that is obtained by molding the powdery raw material under pressure. This appears to result from the action to minimize the air gaps at the time the particles adhere to each other by the action of the surface tension of the water. By this action, even the carbon powder having large air gaps within this powder filled volume and, hence, having a so-called low bulk density appears to be finely divided and taken into the granulated particles during the granulation/In other words, this effect appears to arise without depending on the magnitude of the bulk density of the powder and the bulk density of the carbon will little affect on the fine division of the granulated particles.

Where the molding under pressure is carried out with such a raw material, the granulated particles deform to a predetermined shape to form the shape of the briquette B by effect of the plastic deforming behavior of the granulated particles within the mold, without considerably loosing the apparent density thereof, with the consequence that the residue air is extremely reduced as compared with the carbon powder that is not granulated and, therefore, lamination resulting at least from the residue air will not occur. Although it appears that the briquette strength would possibly be lowered, as compared with the briquette B made of the steelmaking dust itself under the same condition, with decrease of the adhesive force of the powder particles which is brought about by the addition of the carbon powder, the apparent density of the briquette B decrease by a quantity corresponding to the amount of the carbon powder added and, therefore, without the drop strength being considerably reduced, about the same briquette strength as that of the briquette made of the steelmaking dust and without the carbon powder can be obtained as clearly shown in Table 1.

Figure 5:
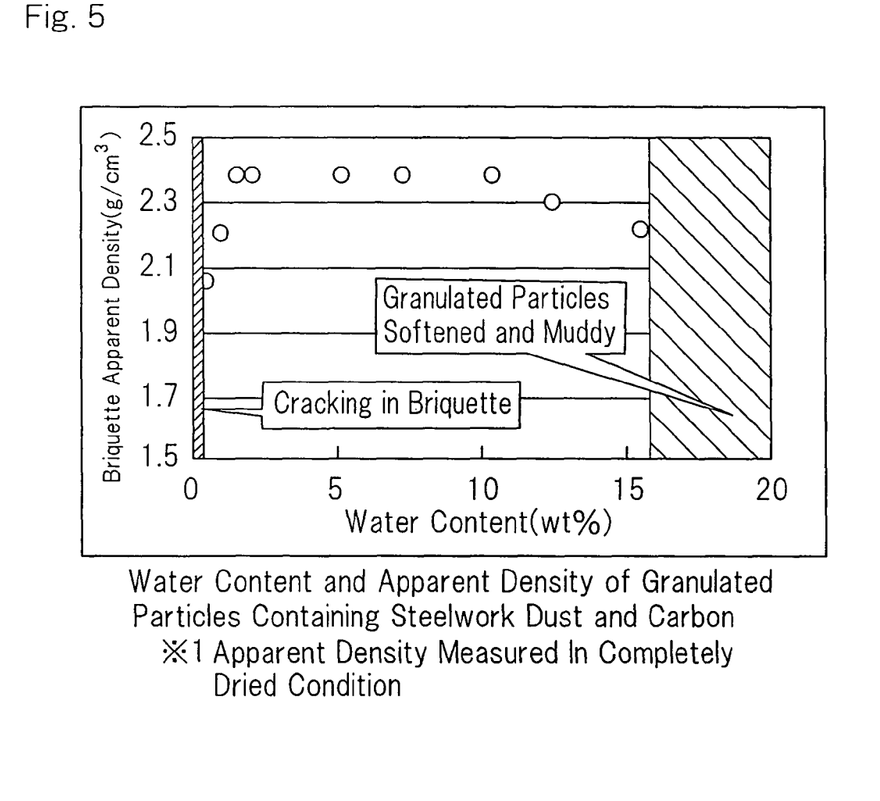
FIG. 5 is a chart showing the relation between the water content and the apparent density of a briquette.

FIG. 5 illustrates the chart showing change in apparent density of the completely dried briquette when the use is made of the granulated particles of a varying water content in the sample, in which the mixture of the steelmaking dust and the carbon powder (4:1 in ratio by weight) were mixed and granulated in the granulating machine and the cylindrical briquette having a diameter of Φ 70 and also having a ratio of the height relative to the diameter which is 80% was made with the molding pressure of 50 MPa. If the water content is lower than 0.5 wt %, cracking was found in the briquette after having been molded and no apparent density could be measured. Although the molding of the briquette is possible when the water content is equal to or higher than 0.5 wt %, the apparent density will become substantially constant when the water content is within the range of 1.5 to 10 wt %. If the water content exceeds 10 wt %, the apparent density of the briquette B decreases to some degree. If the water content of the granulated particles exceeded 15 wt %, the granulated particles were softened to a muddy state and no experiment could be continued.

From the results of the foregoing experiments, it appears that the water component, when the granulated particles undergo a plastic deforming behavior within the mold, facilitates the deformation with the friction among the powdery particles being reduced. This effect manifests when the water content is equal to or higher than 0.5 wt %, but when the water content reaches at a region where the water content exceeds 10 wt %, the water component itself comes to behave as a liquid and, therefore, improvement of the apparent density of the briquette B is adversely affected. The water content of the sample, in which the mixture of the steelmaking dust and the carbon powder (4:1 in ratio by weight) were mixed and granulated in the granulating machine and which is effective to provide a practically sufficient briquette strength is within the range of 0.5 to 15 wt % and, preferably, within the range of 1.5 to 10 wt %.

While in conducting the series of experiments, the briquette B was manufactured with the use of the steelmaking dust discharged from the electric furnace, the dust that can be employed in the practice of the present invention may be any dust that contains as a principal component such iron and its oxides that can be produced during the practice of the steelmaking process, such as dust that can be produced in a steel converter, a blast furnace or during any other steelmaking process. Also, the material containing carbon as a principal component may not be always limited to the carbon powder illustrated in the preferred embodiment, but may be graphite or any other finely divided carbon or the like.

In order to adjust the water content in the steelmaking dust 11 shown in FIG. 1, each of the solidifying mechanisms 6 or the path of supply of the steelmaking dust 11 towards each of the solidifying mechanisms 6 is preferably provided with a water content adjusting means 36. The water content adjusting unit 36 may be provided in, for example, the first hopper 5A or the second hopper 5B. For the water content adjusting unit 36, a sprinkler system or a drying device can be employed. The sprinkler system may be in the form of a sprinkler, dispenser or the like and the drying device may be in the form of a heating oven, a hot air heater or an air blower.

The steelmaking dust containing the water component has an effect of promoting rusting of metallic parts of the apparatus including the mold 7, and therefore, rust prevention of the apparatus is required. In particular, for the mold 7, in which a rust preventing oil can be hardly used with no difficulty, the rust prevention is important and it is extremely important that, even in the mold 7, an inner diametric portion of the die 7a, which is held in directly contact with the briquette B, and the plungers 12, 12A are to be protected from rusting. For the rust prevention of the mold 7, it is preferred that the mold 7 has to be applied with the excellent rust preventing material as discussed hereinbefore or the rust preventive films 31 to 33 by means of a coating technique such as employed in the example of FIG. 6.

Of the various molds employed in the course of experiment, the mold or molds made of a material such as SKH51 involved rusting and came to be no longer usable. This is because once the steelmaking dust 11 containing the water component adheres to the mold 7, the rusting is promoted. The use of SKD11 treated with a hard chrome plating was found to be used continuously without being rusted. Although in the embodiment, the hard chrome plating was used, any material or coating having a function as a mold 7 and excellent in rust preventing property can be employed in the practice of the present invention.

In the steelmaking dust solidifying apparatus shown in FIG. 1, since depending on the water content, a problem would arise in connection with the filling characteristic (flow characteristic into the mold 7) of the granulated particles 11p of the steelmaking dust, a powder supply portion of each of the solidifying mechanisms 6 is preferably provided with the previously mentioned forced filling device 30 having a certain forcibility.

The orientation of the mold is not limited to a particular direction and, where the mold is oriented vertically, a powder supply machine or a mechanism for pushing by means of a screw can be suitably employed for the forced filling device 30, but where the mold is oriented horizontally, a mechanism for pushing by means of a screw can be suitably employed for the forced filling device 30.

Hereinafter, the proper amount of carbon in the raw material for the briquette B will now be discussed. As hereinbefore described, the addition of the carbon material such as the carbon powder or the like to the briquette B that is used in recycle of the electric furnace or the like is extremely important in increasing the thermal efficiency of the electric furnace. However, the addition of the carbon material involves the possibility of reducing the strength of the solidified product. On the other hand, even though the addition of the carbon material results in impairment of the strength of the solidified product, a high molding density can be obtained because the material in the form as granulated is supplied into and molded under pressure within the mold, and even though any reinforcement agent such as a binder or the like is not employed, the briquette having a practically sufficient strength can be obtained.

Accordingly, as a result of further studies and experiments conducted by the inventors of the present invention, when the carbon material such as, for example, the carbon powder or the like is added to the granulating machine 19, used to granulate the steelmaking dust 11, to eventually provide the granulated particles 11b that have been granulated together with the steelmaking dust 11 and when the amount of the carbon added is selected to be equal to or smaller than 50 wt % relative to the material including the granulated particles 11p containing the steelmaking dust 11 and the carbon as a principal component, the inventors of the present invention have found that the moldability excellent even where the carbon is added can be obtained. Examples of experiments therefor will now be described.

In those experiments, with the use of a mold 21 including, as shown in and described with particular reference to FIG. 4, the cylindrical die 21A and the lower plunger 21C serving as a plug and the pressing plunger 21B, solidification of the steelmaking dust 11 was conducted in the following manner.

The steelmaking dust used is the one discharged from the electric furnace and has a bulk density within the range of 1.4 to 1.8 g/cm$^3$. The carbon powders used have a bulk density of 0.31 g/cm³ (the carbon powder having this bulk density is referred to as a "low density carbon powder) and a bulk density of 0.75 g/cm³ (the carbon powder having this bulk density is referred to as a "high density carbon powder). For samples, total four samples were used, which include two second level samples (5 to 15 mm in particle size), which have been granulated by the granulating machine while the low density carbon powder and the high density carbon powder were mixed with the steelmaking dust within the granulating machine, and two second level comparative samples, which were prepared merely by mixing the steelmaking dust with the low density carbon powder and the high density carbon powder, and the raw materials having a varying mixing ration for each sample group was prepared for the solidifying experiment. It is to be noted that the water content of each of the powdery raw materials was within the range of 3 to 8%.

The following Table 2 illustrates result of measurement of the apparent densities of the respective completely dried, cylindrical briquettes B, which have a diameter of 70 mm and are 80% in ratio of the height relative to the diameter, made by the use of a varying amount of carbon addition and a varying molding pressure.

In Table 2, Comparative Example 1 was prepared with the use of the steelmaking dust and the low density carbon powder; Comparative Example 2 was prepared with the use of the steelmaking dust and the high density carbon; Example 1 of the present invention was prepared with the use of the granulated particles (the steelmaking dust+the low density carbon powder); and Example 2 of the present invention was prepared with the use of the granulated particles (the steelmaking dust+the high density carbon powder).

TABLE 2

Apparent Density

Amount of Carbon Addition [wt %]

|  | Mold. Pressure (MPa) | 0 | 2 | 5 | 10 | 20 | 30 | 40 | 50 |
|---|---|---|---|---|---|---|---|---|---|
| Comp. 1 | 5 | 2.35 | 2.29 | 2.25 | — | | | | |
|  | 10 | 2.49 | 2.44 | 2.39 | — | | | | |
|  | 25 | 2.65 | 2.55 | 2.43 | — | | | | |
|  | 50 | 2.85 | 2.74 | — | | | | | |
|  | 75 | 2.98 | 2.86 | — | | | | | |
|  | 100 | 3.15 | — | | | | | | |
| Comp. 2 | 5 | 2.35 | 2.32 | 2.28 | 2.21 | 2.08 | 1.95 | 1.82 | — |
|  | 10 | 2.49 | 2.46 | 2.42 | 2.35 | 2.21 | 2.06 | 1.92 | — |
|  | 25 | 2.65 | 2.61 | 2.57 | 2.50 | 2.35 | 2.19 | 2.05 | — |
|  | 50 | 2.85 | 2.81 | 2.77 | 2.68 | 2.52 | 2.36 | 2.20 | — |
|  | 75 | 2.98 | 2.95 | 2.90 | 2.81 | 2.64 | 2.47 | 2.30 | — |
|  | 100 | 3.15 | 3.10 | 3.06 | 2.97 | 2.79 | 2.67 | 2.43 | — |
|  | 150 | 3.32 | 3.30 | 3.23 | 3.13 | 2.94 | 2.75 | 2.56 | — |
|  | 200 | — | — | — | — | — | — | — | — |
| Example 1 | 5 | X | X | X | X | X | X | X | X |
|  | 10 | 3.00 | 2.97 | 2.93 | 2.82 | 2.67 | 2.51 | 2.32 | 2.15 |
|  | 25 | 3.12 | 3.09 | 3.04 | 2.93 | 2.79 | 2.59 | 2.41 | 2.23 |
|  | 50 | 3.25 | 3.23 | 3.16 | 3.06 | 2.89 | 2.70 | 2.51 | 2.33 |
|  | 75 | 3.37 | 3.34 | 3.29 | 3.17 | 2.99 | 2.78 | 2.60 | 2.41 |
|  | 100 | 3.48 | 3.41 | 3.35 | 3.24 | 3.06 | 2.85 | 2.66 | 2.47 |
|  | 200 | 3.61 | 3.55 | 3.50 | 3.39 | 3.18 | 2.96 | 2.77 | 2.57 |
|  | 300 | 3.65 | 3.59 | 3.53 | 3.43 | 3.23 | 2.99 | 2.81 | 2.60 |
|  | 400 | — | — | — | — | — | — | — | — |
| Example 2 | 5 | X | X | X | X | X | X | X | X |
|  | 10 | 3.00 | 2.99 | 2.95 | 2.86 | 2.69 | 2.52 | 2.34 | 2.16 |
|  | 25 | 3.12 | 3.11 | 3.07 | 2.97 | 2.80 | 2.62 | 2.43 | 2.26 |
|  | 50 | 3.25 | 3.24 | 3.19 | 3.09 | 2.91 | 2.72 | 2.54 | 2.36 |
|  | 75 | 3.37 | 3.36 | 3.31 | 3.21 | 3.02 | 2.83 | 2.63 | 2.42 |
|  | 100 | 3.48 | 3.44 | 3.38 | 3.28 | 3.09 | 2.89 | 2.70 | 2.49 |
|  | 200 | 3.61 | 3.58 | 3.52 | 3.42 | 3.21 | 3.01 | 2.79 | 2.56 |
|  | 300 | 3.65 | 3.60 | 3.56 | 3.45 | 3.25 | 3.04 | 2.83 | 2.61 |
|  | 400 | — | — | — | — | — | — | — | — |

The following should be noted:
1) The apparent density of the briquette is represented by the value measured when the briquette was in a completely dried condition.
2) The marking "—" in the table indicates that molding was impossible (occurrence of lamination).
3) The marking "X" in the table indicates incapability of molding because of insufficient pressing force.

In the case of the combination of the steelmaking dust and the low density carbon powder (Comparison 1), if the amount of the low density carbon to be added is larger than 10 wt %, lamination occurs regardless of the molding pressure condition and, therefore, no shape retention is possible. In the case of the combination of the steelmaking dust and the high density carbon powder (Comparison 2), the shape retention is possible when the amount of the high density carbon powder to be added is equal to or smaller than 40 wt % and the molding pressure is within the range of 5 to 150 MPa and, at this time, the apparent density of the briquette B is within the range of 1.8 to 3.3 g/cm³. In contrast thereto, in the case where the raw material prepared by mixing the steelwork dust and the carbon and granulating the mixture (Examples 1 and 2), the shape retention is possible when the amount of the carbon powder to be added is equal to or smaller than 50 wt % and the molding pressure is within the range of 10 to 300 MPa and, at this time, the apparent density of the briquette B is within the range of 2.15 to 3.6 g/cm³

Figure 7:
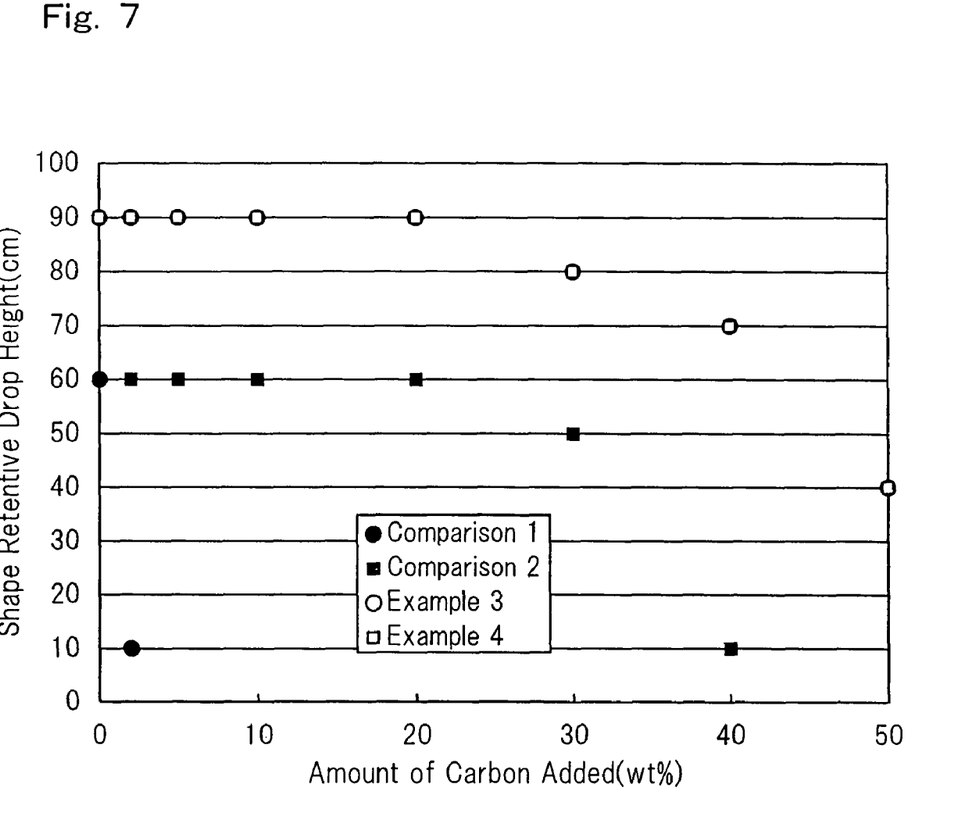
FIG. 7 is a chart showing the relation between the amount of carbon added and the drop height, at which the steelmaking dust solidified product when dropped can retain the shape.

FIG. 7 illustrates results of drop strength tests performed on the briquette when the cylindrical briquettes each 70 mm in diameter and 80% in ratio of the height relative to the diameter were made by the application of the molding pressure of 75 MPa. In the case of the combination of the steelmaking dust and the low density carbon powder (Comparison 1), if the amount of the low density carbon to be added is larger than 5 wt %, no practically sufficient strength can be obtained. In the case of the combination of the steelmaking dust and the high density carbon powder (Comparison 2), the briquette strength retains a substantially constant level when the amount of the high density carbon powder to be added is equal to or smaller than 25 wt %. When the amount of the carbon to be added exceeds 25 wt %, the briquette strength decreases with increase of the amount of the carbon and considerably decreases when the amount of the carbon is equal to 40 wt %. Accordingly, it is when the amount of the carbon to be added is smaller than 40 wt % that the practically sufficient briquette strength can be obtained. In the case where the raw material prepared by mixing the steelmaking dust and the carbon and granulating the mixture (Examples 1 and 2), the briquette strength higher than that exhibited by the combination of the steelmaking dust and the high density carbon powder (Comparison 2) is exhibited at all of the amounts of the carbon to be added and, even when the amount of the carbon is equal to 50 wt %, the shape retaining strength can be maintained.

When the molding under pressure is carried out with the use of the granulated raw material, the granulated particles are deformed to a predetermined shape within the mold without considerably decreasing the apparent density, due to the plastic deforming behavior of the granulated particles, which have already been finely divided within the mold, to thereby form the shape of the briquette B and, accordingly, it is possible to manufacture the briquette B having a higher apparent density than that exhibited when the powdery raw material is molded under pressure and also having a high shape retaining strength.

In the case of the briquette B having the carbon added thereto, the overall adhesive force of the powder decreases as compared with the briquette prepared solely from the steelmaking dust under the same molding condition and, therefore, there is the possibility that the briquette strength may lower. However, the apparent density of the briquette itself decreases depending on the amount of the carbon added and, therefore, there is no possibility that in terms of the drop strength, the briquette strength will not be reduced considerably even in the case of the briquette B. In other words, in the case of the briquette B prepared from the material, in which the steelmaking dust and the carbon are mixed and granulated, no reduction of the drop strength occur even the amount of the carbon added increases, provided that the amount of the carbon added is equal to or smaller than 40 wt %. If the amount of the carbon is higher than that, an effect brought about by the reduction of the adhesive force of the powder particles increases to such an extent as to result in reduction of the briquette strength, but if the amount of the carbon added is equal to or smaller than 50 wt %, the practically acceptable strength can be maintained.

It is to be noted that during the course of the experiments, no study have been made regarding the amount of carbon added in a quantity in excess of 50 wt %. The reason therefor is that the ratio of the steelmaking dust in a region in which the carbon is added in a quantity in excess of 50 wt % is so small that the recycle efficiency may lower, and, therefore, such study will not be worth to conduct. Also, since if the amount of the carbon to be added is smaller than 2 wt %, no effect of improving the thermal efficiency of the furnace cannot be obtained, the amount of the carbon to be added is therefore preferably within the range of 2 to 50 wt %. Further, the amount of the carbon to be added is more preferably within the range of 2 to 20 wt %. The reason therefor is that when the amount of the carbon is within the range of 2 to 20 wt %, the effect of improving the thermal efficiency of the furnace can be maximized.

Considering the above discussed amount of the carbon to be added and the molding pressure enough to accomplish the intended solidification, the apparent density of the briquette B that can be handled is within the range of 2.15 to 3.6 g/cm$^3$ in the completely dried condition. Also, if the amount of the carbon to be added is within the range of 2 to 20 wt %, which is a more preferable range, the apparent density of the briquette B in the completely dried condition is within the range of 2.67 to 3.6 g/cm$^3$.

Although in conducting the experiments, the briquettes have been made with the use of the steelmaking dust discharged from the electric furnace, the steelmaking dust solidified product of the present invention and the dust used in the practice of the method of making thereof may be any dust that contains iron and its oxides as a principal component produced during the steelmaking, such as a dust produced in the steel converter or blast furnace, or any other dust produced in the practice of any other steelmaking process. Also, the material containing carbon as a principal component may not be always limited to that shown and described in connection with the preferred embodiment of the present invention, graphite or finely divided carbon can be equally employed.

What is claimed is:

1. A steelmaking dust solidified product comprising a dust containing, as a principal component, iron and its oxides, produced during a steelmaking, and molded under pressure within a mold with a raw material supplied thereinto, in which the raw material to be charged into the mold comprises globular granulated particles of the dust and a powdery material including carbon as a principal component, the raw material being mixed together and granulated.

2. The steelmaking dust solidified product as claimed in claim 1, wherein the granulated particles have a water content within the range of 0.5 to 15 wt %.

3. The steelmaking dust solidified product as claimed in claim 1, wherein the powdery material including carbon as a principal component is a carbon powder or graphite.

4. The steelmaking dust solidified product as claimed in claim 1, wherein the amount of carbon contained in the raw material is within the range of 2 to 50 wt %.

5. The steelmaking dust solidified product as claimed in claim 4, wherein the solidified product has an apparent density within the range of 2.15 to 3.6 g/cm$^3$ in a completely dried condition.

6. The steelmaking dust solidified product as claimed in claim 1, wherein the granulated particles are of a globular shape and have a particle size within the range of 5 to 15 mm.

7. A method of making a steelmaking dust solidified product, which comprises:
supplying a dust containing, as a principal component, iron and its oxides, produced during a steelmaking, into a mold;
molding under pressure and solidifying the dust within the mold assembly to solidify such dust to thereby provide the steelmaking dust solidified product;
wherein as a raw material to be supplied into the mold, globular granulated particles of the dust and a powdery material including carbon as a principal component, which are mixed together and granulated, are employed.

8. The steelmaking dust solidified product making method as claimed in claim 7, wherein the granulated particles have a water content within the range of 0.5 to 15 wt %.

9. The steelmaking dust solidified product making method as claimed in claim 7, wherein the powdery material including carbon as a principal component is a carbon powder or graphite.

10. The steelmaking dust solidified product making method as claimed in claim 7, wherein the amount of carbon contained in the raw material is within the range of 2 to 50 wt %.

11. The steelmaking dust solidified product making method as claimed in claim 7, wherein the granulated particles are of a globular shape and have a particle size within the range of 5 to 15 mm.

* * * * *